United States Patent [19]
Bovone

[11] 4,295,920
[45] Oct. 20, 1981

[54] APPARATUS FOR AUTOMATICALLY PRODUCING GLAZED INSULATING WINDOW OR DOOR PANELS

[76] Inventor: Luigi Bovone, 15070 Belforte Monferrato, Alessandria, Italy

[21] Appl. No.: 97,789

[22] Filed: Nov. 26, 1979

[30] Foreign Application Priority Data

Dec. 18, 1978 [IT] Italy .................................. 30947/78

[51] Int. Cl.³ ............................................. B32B 31/00
[52] U.S. Cl. .................................. 156/557; 156/107; 156/563; 414/41; 414/71
[58] Field of Search ............................ 414/41, 71–72, 414/95; 156/557–559, 563, 107

[56] References Cited

U.S. PATENT DOCUMENTS

| | | | |
|---|---|---|---|
| 3,964,953 | 6/1976 | Mitchard | 414/71 X |
| 3,989,235 | 11/1976 | Husges | 414/41 X |
| 4,042,125 | 8/1977 | Falkinger | 414/95 |

Primary Examiner—David A. Simmons
Attorney, Agent, or Firm—Steinberg & Raskin

[57] ABSTRACT

An apparatus for automatically producing glazed insulating window or door panels comprising two glass panes spaced apart by a frame, wherein a first pane, situated in a predetermined position, is raised by a device operated by pressurized fluid, and a frame positioned on a horizontally mobile plate and provided with at least a partial coating of adhesive is led by this plate to below the first pane, which is lowered on to said frame and becomes connected thereto because of the presence of the adhesive coating, to form an assembly which, by virtue of the movement of the device, then becomes connected to the second pane situated in said predetermined position.

10 Claims, 4 Drawing Figures

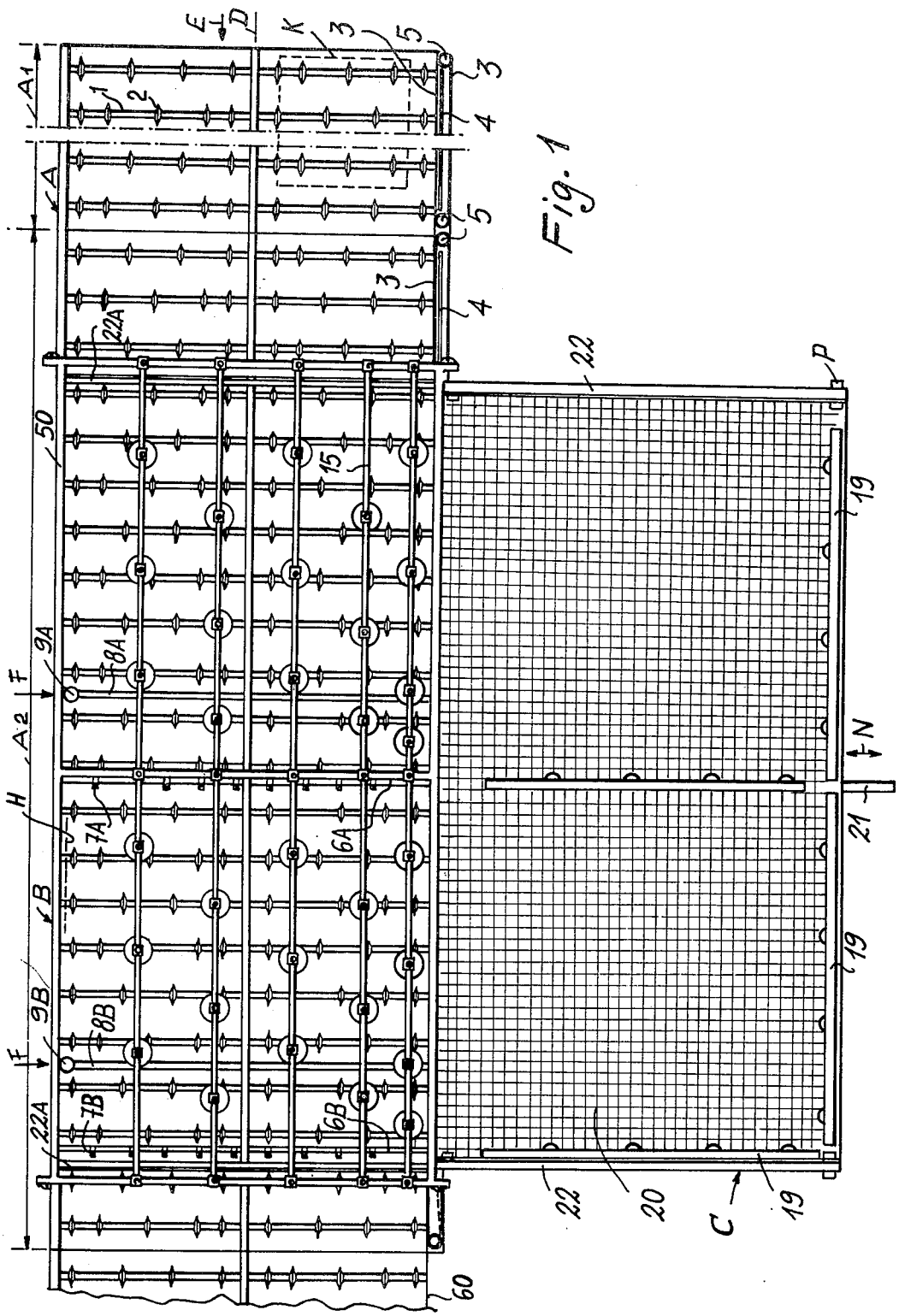

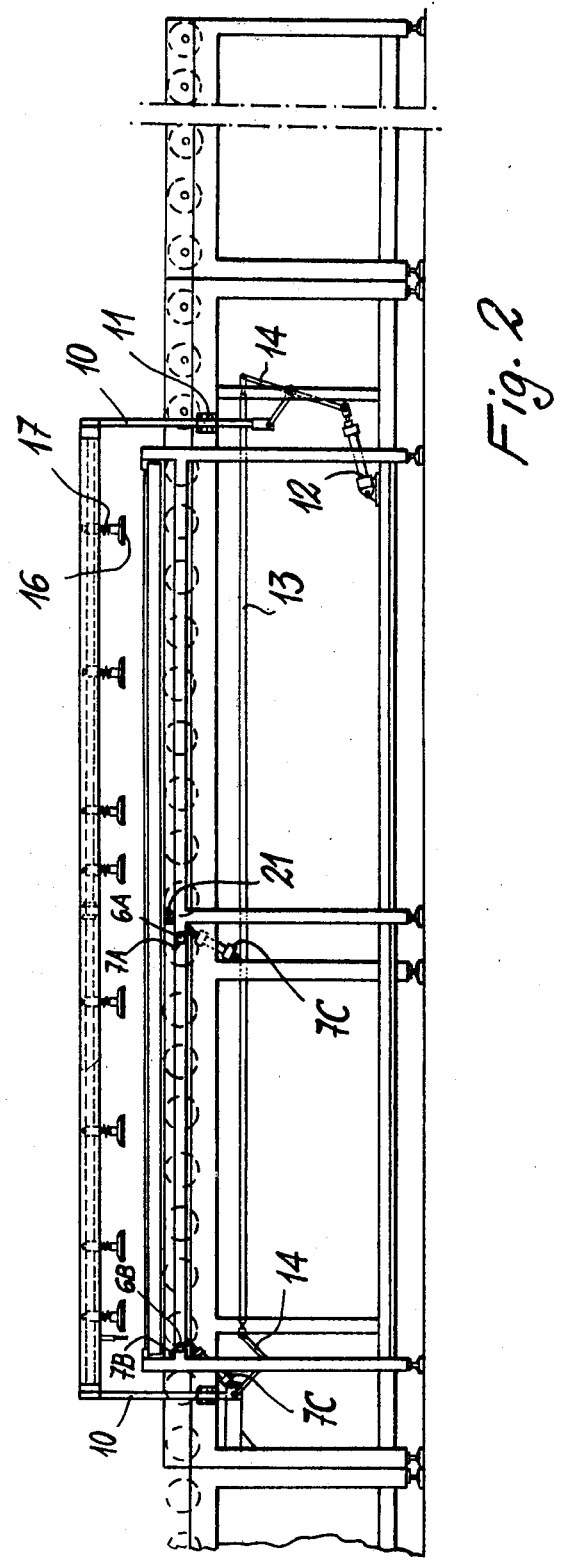

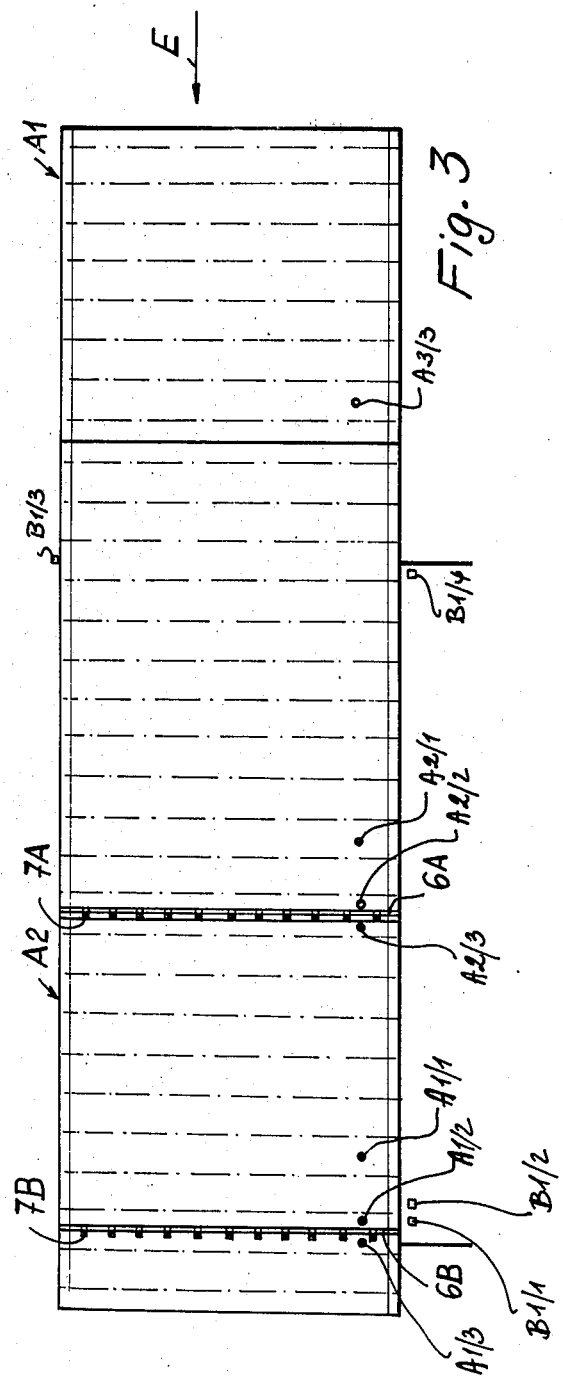
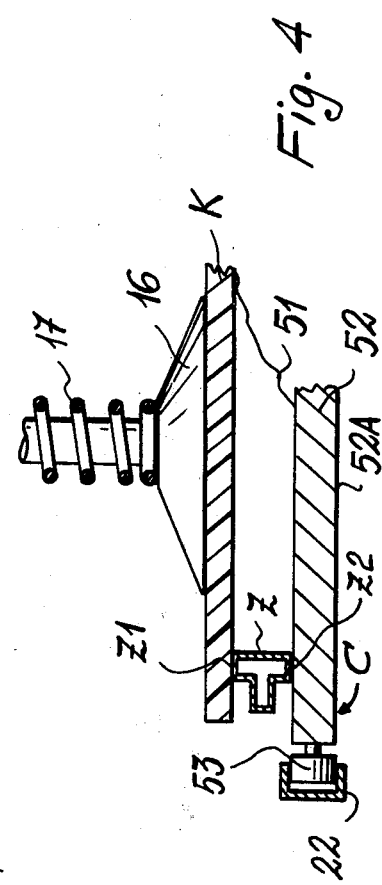

APPARATUS FOR AUTOMATICALLY PRODUCING GLAZED INSULATING WINDOW OR DOOR PANELS

SUMMARY OF THE INVENTION

This invention relates to an apparatus for automatically producing glazed insulating window or door panels of the type constituted by a pair of similar glass panes mounted on the opposing sides of a metal section spacer frame to which said panes are joined by means of adhesive.

Glazed insulating panels of the above-described type are at present produced by the following steps: cutting the glass panes to size, washing and drying them, forming the spacer frame and fitting an elastic butyl cord along its opposing sides, manually resting the frame on one pane and then carefully lowering the second pane onto the other side of the frame, and finally applying the sealant along the frame.

This procedure is slow, imprecise and to a certain extent risky for the operator.

The object of the present invention is to provide an apparatus which automates the operations concerned in connecting the panes to the spacer frame, and which can therefore be used immediately downstream of a normal machine which degreases, washes and dries the glass panes.

These and further objects which will be more apparent from the detailed description hereinafter are attained by the apparatus according to the invention, wherein a first pane, fed by a conveyor into a predetermined position, is raised by a device operated by pressurised fluid, preferably a hydraulic device, and retained above said position, while a table which is mobile transversely to the conveyor transfers to a position below said first pane a spacer frame which is partly coated with adhesive, and which, by lowering and then raising the device, is applied to the first pane to form an assembly. The assembly is raised above said position, into which a second pane arrives to be combined with the assembly by lowering and releasing the device, so forming the glazed insulating panel, which is then removed by the conveyor.

The invention will be more apparent from the detailed description of a preferred embodiment given hereinafter by way of non-limiting example with reference to the accompanying drawing, in which:

FIG. 1 is a diagrammatic plan view of apparatus according to the present invention;

FIG. 2 is a side view of the apparatus illustrated in FIG. 1;

FIG. 3 is a more diagrammatic plan view of the apparatus, the purpose of this view being only to illustrate the position of the sensors which control the operational stages of the apparatus; and FIG. 4 is a diagrammatic detailed sectional view of the spacer frame disposed on a transfer table during the application of the overlying pane.

With reference to the figures, the glass panes K originating from a normal washing-degreasing and drying station reach the apparatus according to the invention by way of a roller conveyor. As the station or roller conveyor do not form part of the invention, they are neither shown nor described.

The apparatus according to the invention can be divided ideally into three sections:

(1) a roller table A for accelerating and positioning the glass panes;
(2) a hydraulic sucker device B for assembling the panes on their spacer frame;
(3) a table C for positioning and transferring the frames.

The roller table A comprises a series of parallel shafts 1 inclined at about 1° to the normal to the main axis D of the apparatus, in order to urge the glass panes towards a lateral datum 4. The shafts are rotated by a motor drive, not shown, but constituted for example by an electric motor with reduction gear and a pinion and chain connection. The rollers 2, constructed for example of aluminium, are mounted on the shafts 1 in a staggered arrangement, and their diametrical cross-section reduces towards the outer edge to terminate in a plastic ring. To obtain spacing between the panes which arrive in the direction of the arrow E, the part A1 of the roller table can reach a speed higher than the speed of the tables which precede it and which are not shown. The section A1 therefore serves for positioning and spacing the panes. Both the section A1 and the next section A2 of the roller table include, along that side of the table towards which the inclination of the shafts 1 tends to urge the panes K, a belt 3 which operates in a vertical position and rests at its rear, along its entire working portion, on a fixed stop wall 4. The belt passes over two pulleys 5 positioned at its ends, at least one of which is driven synchronously with the shafts 1 by any known means. The belt acts as a lateral stop for positioning the panes.

Transverse shafts 6A, 6B provided with radial projections 7A, 7B are spaced apart from each other at a suitable distance in the section A2. These shafts can be rotated by pneumatic jacks 7C in such a manner as to assume two positions, namely one in which the projections 7A, 7B interfere with the feed path of the pane K, and the other in which this interference does not occur. These shafts, or rather their radial projections, act as frontal stops for positioning the panes.

Pushers are suitably disposed in the section A2 to urge the pane towards the belt 3, and thus towards the wall 4 by way of the belt itself. These pushers are constituted by pneumatic cylinders 8A, 8B positioned horizontally below the plane of movement of the glass panes, and act on the edge of the panes by way of idle rollers 9A, 9B. The idle rollers are disposed at the same level as the plane of the panes such that the latter can be pressed against the belt 3 when, during the assembly operations, the rollers 9A, 9B are moved in the direction of the arrow F.

In the section A2 above the roller table, there is disposed the hydraulic sucker device B, which can be moved towards or away from the roller table A. This device comprises a rectangular frame 50 constructed of metal sections and comprising a series of longitudinal and cross members. The longitudinal members 15 carry a series of suckers 16 which are slidable against respective springs 17 and can be connected alternately to atmosphere and to a suction source. At its four corners, the frame 50 carries a shaft 10 guided vertically in bushes 11 carried by the table. A pneumatic jack 12 acts by way of rods and levers 13, 14 on these shafts in order to cause them to move vertically.

On one side of the roller table A is disposed the mobile table C for positioning and transferring the frames Z (FIG. 4). It comprises a horizontal plate 51 (FIG. 4) mounted on a frame 52. The frame is supported in lateral guides 22 by idle rollers 53. These lateral guides extend transversely to the roller table A, as shown at 22A in FIG. 1. The lower face 52A of the frame 52 remains above the plane of movement of the panes K so as not to interfere with those panes which are on the roller table. The frame 52 and thus the plate 51 fixed to it are driven in the direction of the arrow N by a rodless long-stroke pneumatic cylinder 21 manufactured by Messrs. Origa International AB, Kungsor, Sweden. In order to facilitate the correct positioning of the spacer frame Z on the plate 51, the latter is provided with a series of stops 19 and a graduated squared surface 20.

By its movement, the frame 51 is brought below the hydraulic sucker device B, the spacer frame Z being located in accordance with the same positioning references as the glass panes.

The structure of the roller table A supports in suitable positions a series of presence sensors or microswitches, the arrangement of which is shown in FIG. 3 in which they are indicated by A1/1, A1/2, A1/3, A2/3, A2/2, A2/1, A3/3, and the structure of the pneumatic device B carries the presence sensors or microswitches B1/1, B1/2, B1/3, B1/4.

The operation is as follows:

The pane K, arriving from the direction E, is spaced apart from the next pane by virtue of the greater speed of the drive rollers 2 of the section A1, and passes through the section A2 to approach the lateral datum positions (i.e. the belts 3 and walls 4) because of the inclined arrangement of the rollers 2.

When the pane K engages the presence sensor A1/1, the front stops 7B on the shaft 6B situated on the left hand side of the table are raised, and the left hand transverse pusher 8B-8A is moved so as to laterally retain the pane during the assembly operations.

The pane K continues to move forward until its front edge touches the stops 7B of the shaft 6B. Under such conditions it is positioned along perpendicular datum lines. In this position, the pane acts on the sensor A1/2, which causes both the pane feed to stop, and the hydraulic device B carrying the suckers to descend.

When the suckers 16 come into contact with the first pane, the descent of the device B is halted automatically by virtue of the presence sensor B1/1 carried by said device, and the suckers 16 become connected to the suction source. The device B is then raised, carrying with it the first pane, and stops in this position. In the meantime, the operator situated in front of the table C carefully rests a spacer frame Z on the plate 51, precisely in a position such that when the plate has reached its end-of-stroke position H under the action of the cylinder 21, it is located exactly below the first pane Z. In order for the frame Z to remain adhering to the plate 51 in its predetermined position, its two opposing faces Z1 and Z2 will have been at least partly coated previously with a layer of butyl-based adhesive which has a much lower degree of adherence to the plate 51 than to the glass. The plate 51 comprises a tetrafluoroethylene-based coating on to which a silicone film is occasionally sprayed.

The operator operates the activation pushbutton P (FIG. 1) and the cylinder 21 moves the table C in the direction N. This positions the metal frame Z under the sucker device B. When it reaches its end of stroke, the plate 51, 52 activates the sensor B1/3 which causes the sucker device B to again descend in order to pick up the frame from the plate 51, 52 (see FIG. 4). When the pane K has been applied to the frame Z, the sensor B1/2 operates such that the hydraulic device B rises again to raise both the pane K and the frame Z which, because of the difference in adhesion between the glass pane and frame and between the frame and plate 51, now adheres to the pane. The plate 51, 52 then returns to its initial position where it stops.

During the positioning of the frame Z, the second pane becomes positioned in a manner analogous to the first by the action of the same sensors on which the first pane operated.

The hydraulic device descends, again operated by the sensor A1/2, and, by the operation of the sensor B1/1, deposits the assembly (formed by the first pane K and the frame Z attached to its front face) on the second pane to thus form the unit, i.e. the glazed panel, and rises again to its initial position.

The frontal stops 7B of the shafts 6B are also lowered, and the surface rollers are again driven. The unit thus formed passes along a roller table 60 and reaches a calender, not shown. The calender presses the unit and causes the frame Z to adhere closely to the panes by way of the usual butyl layer which had been distributed over the two sides of the frame before it was placed on the plate 50, 51.

The aforegoing description relates to the use of the apparatus for producing one glazed panel for each operational cycle. However, the apparatus can also produce two glazed panels per cycle. For this purpose, the shaft 6A with the projections 7A and the pusher 9A are provided, together with the sensors A2/1, A2/2 and A2/3 associated therewith, which did not operate in producing only one glazed panel per cycle. In this case, the first and second pane are positioned and then raised by the sucker device B, two frames Z are placed on the frame support table C, and the third and fourth pane form the lower side of the two units. In order to carry out this type of operation, the dimensions of the glass panes must not exceed the centre line of the frame support table C in the length direction.

What is claimed is:

1. An apparatus for automatically manufacturing glazed insulating window or door panels constituted by two glass panes spaced apart by a frame interposed therebetween, comprising:

first means for situating a first pane in a predetermined position;

second means located in operative relationship to said first means for raising the first pane from a predetermined position to an elevated position;

mobile plate means located in operative relationship to said first means for situating a frame provided with at least a partial coating of adhesive in a certain position below the first pane when the latter is in its elevated position;

said second means further comprising means for lowering the first pane from the elevated position when the frame is situated in a certain position until the first pane contacts one side of the frame to form an assembly therewith and for thereupon raising the assembly;

said first means further comprising means for situating the second pane in a predetermined position below said assembly whereupon said second means lowers said assembly until the frame contacts the other side of the frame to form a panel.

2. The combination of claim 1 wherein said second means comprises a mechanism operated by pressurized fluid.

3. The combination of claim 1 wherein said first means comprises at least one roller table, stop means associated with said roller table for insertion into the path of movement of the panes, and thrust means for urging said panes in a direction transverse to their path of movement.

4. The combination of claim 3 wherein said roller table includes a plurality of substantially parallelly extending rotatable shafts having respective axes which are inclined to the perpendicular and to the longitudinal axis of the conveyer, and rollers mounted on each of said shafts.

5. The combination of claim 4 wherein said rollers on each shaft are located in staggered relationship relative to said rollers on shafts adjacent thereto.

6. The combination of claim 1 wherein said mobile plate means includes a movably mounted plate, said plate having a graduated squared surface, and a series of stops located in operative relationship with said plate.

7. The combination of claim 6 wherein said plate has a surface coating comprising a tetrafluoroethylene base coating.

8. The combination of claim 7 wherein said coating further comprises a silicone coating.

9. The combination of claim 1 wherein said second means includes a plurality of suckers supported on a frame work mounted for vertical reciprocating movement, said suckers being adapted for connection to a source of suction.

10. The combination of claim 3 further including an endless driven belt associated with said roller table, said belt being situated in a substantially horizontal plane and having an inner portion adapted to slide along a thick surface.

* * * * *